United States Patent Office 2,799,531
Patented July 16, 1957

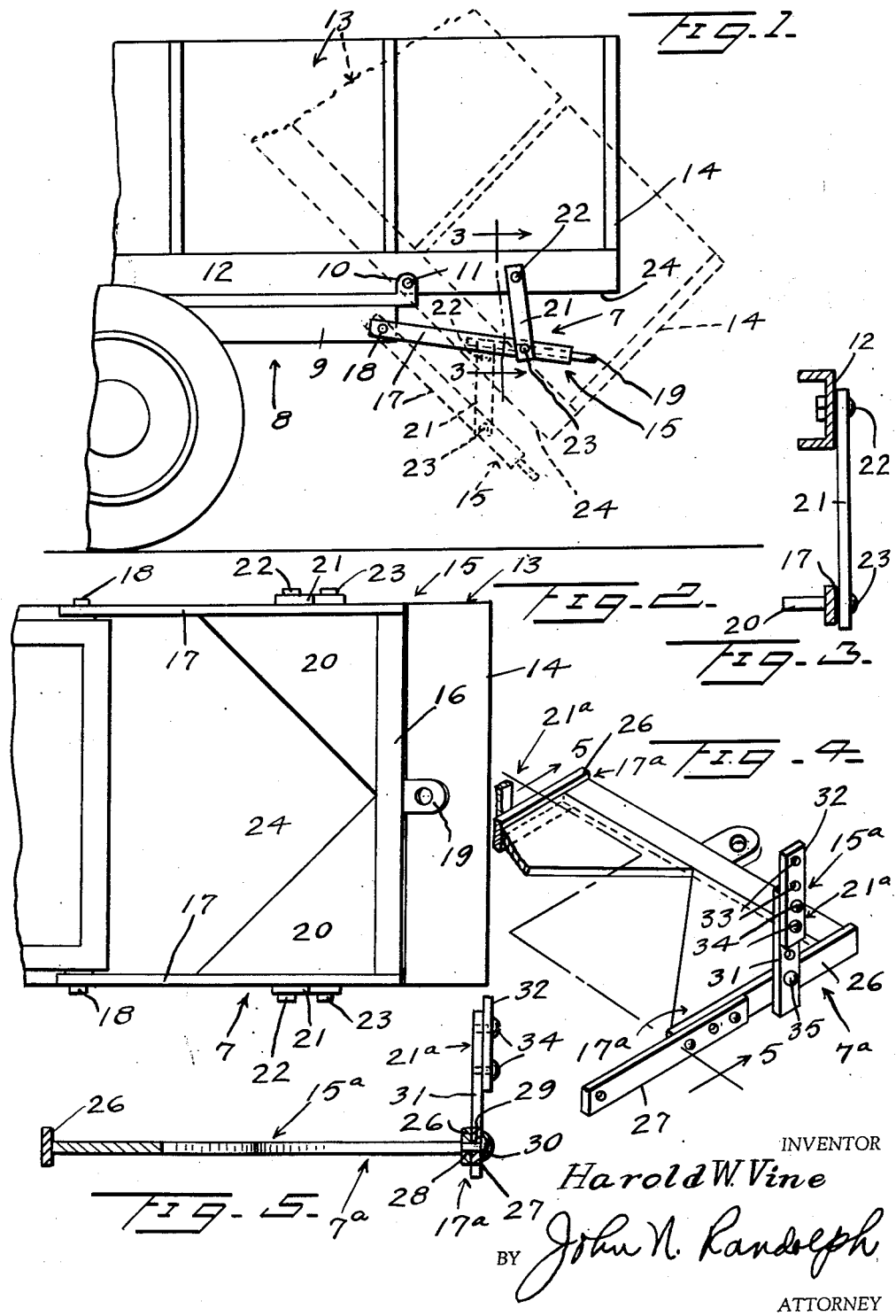

2,799,531

TRAILER HITCH FOR DUMP TRUCKS

Harold W. Vine, Zurich, Kans.

Application November 17, 1954, Serial No. 469,506

9 Claims. (Cl. 298—17)

This invention relates to a novel hitch for coupling farm machines and other trailer equipment to a dump truck, and has for its primary object to provide a novel trailer hitch which is normally disposed in a convenient position beneath the rear portion of a dump truck bed so that a trailer vehicle may be readily coupled thereto.

More particularly, it is an aim of the present invention to provide a trailer hitch which is swingably supported on the dump truck frame or chassis and connected to the rear portion of the truck body to swing downwardly when the dump truck body is tilted to a dumping position, to thus provide a hitch which will not interfere with the normal swinging movement of a dump truck body to and from a conveying position and a dumping position.

Still a further object of the invention is to provide a trailer hitch for dump trucks of extremely simple construction, which will be extremely efficient and durable in operation and which may be quickly applied to or removed from a conventional dump truck.

A further object of the invention is to provide a trailer hitch adapted to fit dump trucks of different sizes.

Various other objects and advantages of the invention will hereinafter become more fully apparent from the following description of the drawing, illustrating presently preferred embodiments thereof, and wherein:

Figure 1 is a side elevation view of the rear portion of a conventional dump truck showing the hitch applied thereto;

Figure 2 is a bottom plan view of the rear portion of the dump truck and hitch;

Figure 3 is an enlarged fragmentary vertical sectional view, taken substantially along a plane as indicated by the line 3—3 of Figure 1;

Figure 4 is a fragmentary perspective view of a slightly modified form of the dump truck hitch, and Figure 5 is a fragmentary transverse sectional view of the modified hitch, taken substantially along a plane as indicated by the line 5—5 of Figure 4.

Referring more specifically to the drawing, and first with reference to Figures 1 to 3 thereof, for the purpose of illustrating a preferred application and use of the dump truck hitch, designated generally 7 and illustrated in these figures, a portion of the rear end of a conventional dump truck, designated generally 8, has been illustrated in Figures 1 and 2.

The rear ends of the side sills 9 of the chassis or frame of the dump truck have upstanding apertured ears 10 receiving aligned pivot elements 11 which are journalled therein and which are connected to bottom side rails 12 of the dump truck body 13, near to but spaced from the rear end 14 of the truck body, and about which the truck body 13 pivots relative to the truck chassis between its horizontal carrying or transport position as illustrated in full lines in Figure 1 and its inclined dumping position, as illustrated in dotted lines in Figure 1.

The trailer hitch 7 includes a U-shaped member, designated generally 15, as best seen in Figure 2, comprising an intermediate bar portion 16 and corresponding leg portions 17 having corresponding ends suitably secured to the ends of the bar 16. The legs or side portions 17 are disposed substantially parallel and with the flat sides thereof in vertical planes and substantially parallel to one another. The intermediate portion or bar 16 is preferably disposed with its flat sides at right angles to the flat side faces of the side members 17. The opposite, forward free ends of the side members 17 straddle the rear ends of the sills 9 and are swingably connected thereto by pivot elements 18 which extend loosely therethrough and which are anchored in the sills 9. Thus, the U-shaped member 15 is mounted for vertical swinging movement relative to the sills 9 between its full and dotted line positions of Figure 1. The crossbar 16 of the U-shaped member 15 constitutes a drawbar and is provided intermediate of its ends with an outwardly projecting coupling eye 19 which may be formed integral therewith or suitably secured thereto. The drawbar 16 may be braced relative to the side members 17 by substantially triangular shaped webs 20 which are suitably secured to the bar 16 and the side bars 17.

The hitch 7 also includes a pair of rigid strap members 21 forming hangers or links having upper ends which straddle the side members 12 of the truck body and which are pivotally connected thereto by pivot elements 22 for swinging movement longitudinally of the truck 8. The pivot elements 22 are located between the pivots 11 and the rear end 14 of the truck body. The lower ends of the hangers 21 loosely straddle the side bars 17 and are pivotally connected thereto by pivot elements 23, remote from the pivots 18, and so that the hangers 21 extend downwardly and rearwardly when the truck body 13 is in substantially a horizontal position, as seen in full lines in Figure 1. The hangers 21 are of a length between their pivots 22 and 23 so that when the truck body 13 is thus disposed, the U-shaped member 15 will extend rearwardly from the sills 9 and will be inclined downwardly at a slight angle toward the rear free end thereof.

With the hitch 7 thus disposed as seen in full lines and with its drawbar portion 16 disposed beneath and spaced from a rear part of the truck bed 24, a tongue or other coupling part, not shown, of a trailer vehicle such as a piece of farm machinery may be readily coupled to the truck 8 to be pulled thereby. When the hitch 7 is not in use, it will not interfere with movement of the truck body 13 from its full line carrying position of Figure 1 to its dotted line dumping position, since as the truck body 13 is swung toward a dumping position in a clockwise direction as seen in Figure 1 about the axis of its pivots 11, the straps 21 will exert a downward thrust on the U-shaped member 15 to cause said U-shaped member to swing downwardly to its dotted line position of Figure 1 below and substantially parallel to the bed 24 of the truck body, when said truck body is in its dotted line lumping position. Similarly, when truck body 13 is swung back to its full line carrying position of Figure 1, the hangers 21 will exert an upward pull on the U-shaped member 15 to return it to its full line position of Figure 1 and in which the coupling eye 19 thereof will again be disposed in a position to be coupled to a piece of trailer equipment.

Figures 4 and 5 illustrate another form of the trailer hitch, designaed generally 7a, including a U-shaped member, designated generally 15a. The U-shaped member 15a differs from the U-shaped member 15 in that the side portions, designated generally 17a thereof, each comprises two sections 26 and 27, having overlapping adjacent ends. The rear section 26 of each side portion 17a is provided with a series of spaced threaded outwardly opening recesses 28 and the forward section 27 of each side portion 17a has a plurality of longitudinally spaced unthreaded openings 29, spaced apart a proper distance to align with the threaded recesses 28 and so that one or a plurality of the openings and recesses can be disposed in alignment to receive threaded fastenings 30 for adjustably connecting the sections 27 to the sections 26 to thus vary the length of the side portions 17a.

Likewise, the hitch 7a is preferably provided with a modified form of hanger 21a, each of which is composed of two overlapping strap sections 31 and 32, each of which is provided with a series of longitudinally spaced openings 33, spaced equal distances apart and selective ones of which, of the two sections, may be aligned for receiving fastenings 34 for attaching the hanger sections of each hanger together in overlapping relationship and to thus vary the length of the hangers 21a. A fastening 35 extends loosely through the lowermost opening 33 of the lower section 31 of each hanger 21a and is anchored in a side portion section 26, for swingably connecting the hangers 21a at their lower ends to said sections 26. The upper ends of the upper hanger sections 32 straddle a dump truck, in the same manner as the upper ends of the hangers 21 as seen in Figure 1, and are swingably connected thereto by fastenings, not shown, corresponding to the fastenings 22 and which extend loosely through the uppermost openings 33 of the upper sections 32 and are secured to the sides of the dump truck body. Thus, the length of the hitch 7a can be varied as well as the length of its hangers 21a to accommodate it to dump truck bodies which extend different distances behind the pivots thereof to a chassis.

Various other modifications and changes are likewise contemplated and may be resorted to, without departing from the spirit or scope of the invention as hereinafter defined by the appended claims.

I claim as my invention:

1. In combination with a dump truck having a body mounted for rocking movement about a pivot having an axis disposed crosswise of the dump truck and connecting the truck body at a point spaced from the rear end thereof to the rear end of the truck chassis, a trailer hitch comprising a substantially U-shaped hitch member including a rear crossbar and a pair of substantially parallel side bars fixed to and extending forwardly from end portions of said crossbar, said side bars having forward free ends loosely straddling the rear end of the dump truck chassis, means pivotally connecting said forward ends of the side bars to the truck chassis beneath and forwardly of the pivot connecting the chassis and body, for vertical swinging movement of the hitch member relative to the chassis, said crossbar being provided with coupling means disposed between and spaced from said side bars, and hanger means pivotally connected to said U-shaped member remote from the pivotal mounting thereof on the chassis and pivotally connected to the dump truck body rearwardly of the pivot connecting the dump truck body to the truck chassis.

2. In a combination as defined by claim 1, and means reinforcing and bracing the crossbar relative to said side bars comprising a pair of substantially triangular shaped webs having complementary edges secured to said side bars and longitudinally thereof and complementary edges secured to and extending longitudinally of the crossbar.

3. In a combination as defined by claim 1, said hanger means extending upwardly and forwardly from the hitch member in a normal raised position of the hitch member.

4. In a combination as defined by claim 1, said hanger means comprising rigid strap members pivotally connected to said side bars and to side portions of the dump truck body.

5. In a combination as defined by claim 4, said side bars being formed of extensible sections.

6. In a combination as defined by claim 5, and said straps each being formed of extensible sections.

7. In a combination as defined by claim 1, said side bars being formed of extensible sections.

8. In combination with a dump truck including a truck chassis and a dump truck body pivotally mounted at a point spaced from its ends on the rear end of the truck chassis for rocking movement of the truck body relative to the chassis in substantially a vertical plane, a substantially U-shaped trailer hitch member including spaced substantially parallel side bars having free ends loosely straddling the rear end of the truck chassis, means pivotally connecting said free ends of the side bars to the truck chassis, substantially below the level of the pivotal mounting of the truck body on the chassis, for vertical swinging movement of said hitch member relative to the truck chassis, said hitch member extending rearwardly from the truck chassis, hanger means pivotally connected to the hitch member remote from the axis of its pivot and pivotally connected to the dump truck body behind and spaced from the axis of the pivotal mounting of the truck body on the chassis, and said hitch member including a crossbar defining the rear free end thereof having coupling means disposed between and spaced from said side bars.

9. In a combination as defined by claim 8, and wherein said hanger means is inclined downwardly and rearwardly from the dump truck body to said hitch member when the dump truck body is disposed in a substantially horizontal carrying position.

References Cited in the file of this patent

UNITED STATES PATENTS

| | | |
|---|---|---|
| 2,034,306 | Lowdermilk | Mar. 17, 1936 |
| 2,201,148 | Berger | May 21, 1940 |
| 2,399,810 | Ketcham | May 7, 1946 |
| 2,499,879 | Reed | Mar. 7, 1950 |

FOREIGN PATENTS

| | | |
|---|---|---|
| 659,518 | Great Britain | Oct. 24, 1951 |